(12) United States Patent
Sherigar et al.

(10) Patent No.: US 7,873,105 B2
(45) Date of Patent: Jan. 18, 2011

(54) HARDWARE IMPLEMENTATION OF OPTIMIZED SINGLE INVERSE QUANTIZATION ENGINE FOR A PLURALITY OF STANDARDS

(75) Inventors: Bhaskar Sherigar, Bangalore (IN); Anand Tongle, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1572 days.

(21) Appl. No.: 11/096,988

(22) Filed: Apr. 1, 2005

(65) Prior Publication Data

US 2006/0222064 A1    Oct. 5, 2006

(51) Int. Cl.
*H04B 1/66* (2006.01)

(52) U.S. Cl. .............. 375/240.03; 375/240.25; 375/240.26; 375/240.02; 375/240.04; 375/240.05; 382/233; 382/235; 382/251; 382/239

(58) Field of Classification Search ............ 375/240.03, 375/240.25, 240.26, 240.02, 240.04, 240.05; 382/233, 235, 251, 239
See application file for complete search history.

(56) References Cited

U.S. PATENT DOCUMENTS 5,606,372 A * 2/1997 Kim .................. 375/240.03
5,870,435 A * 2/1999 Choi et al. ............... 375/245

FOREIGN PATENT DOCUMENTS

CN          1137212        12/1996

\* cited by examiner

*Primary Examiner*—Shawn An
(74) *Attorney, Agent, or Firm*—McAndrews, Held & Malloy, Ltd.

(57) ABSTRACT

Presented herein are optimized single inverse quantization engines for a plurality of standards. In one embodiment, there is presented a system for inverse quantizing quantized frequency coefficients. The system comprises an inverse quantizer for inverse quantizing video data encoded in accordance with a first encoding standard and for inverse quantizing video data encoded in accordance with a second encoding standard. In another embodiment, there is presented a decoder for decoding video data. The decoder comprises an inverse quantizer operable to inverse quantize video data encoded in accordance with a first encoding standard and for inverse quantizing video data encoded in accordance with a second encoding standard.

17 Claims, 8 Drawing Sheets

HARDWARE IMPLEMENTATION OF OPTIMIZED SINGLE INVERSE QUANTIZATION ENGINE FOR A PLURALITY OF STANDARDS

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

There are a number of different standards that are available for compressing video data. These standards include standards promulgated by the Motion Picture Experts Group (MPEG). The standards promulgated by MPEG include MPEG1, MPEG-2, and MPEG-4, Part 10 (also known as Advanced Video Coding and also known and now referred to as H.264).

A number of video decoder systems are capable of decoding both MPEG-2 and H.264. However, VC-1 is a recent standard promoted by Microsoft Corporation. Although there are similarities between VC-1 and H.264, VC-1 also includes a number of differences.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein are optimized single inverse quantization engines for a plurality of standards.

In one embodiment, there is presented a system for inverse quantizing quantized frequency coefficients. The system comprises an inverse quantizer for inverse quantizing video data encoded in accordance with a first encoding standard and for inverse quantizing video data encoded in accordance with a second encoding standard.

In another embodiment, there is presented a decoder for decoding video data. The decoder comprises an inverse quantizer operable to inverse quantize video data encoded in accordance with a first encoding standard and for inverse quantizing video data encoded in accordance with a second encoding standard.

These and other advantages and novel features of the present invention, as well as details of an illustrated embodiment thereof, will be more fully understood from the following description and drawings.

DETAILED DESCRIPTION OF THE INVENTION

Figure 1:
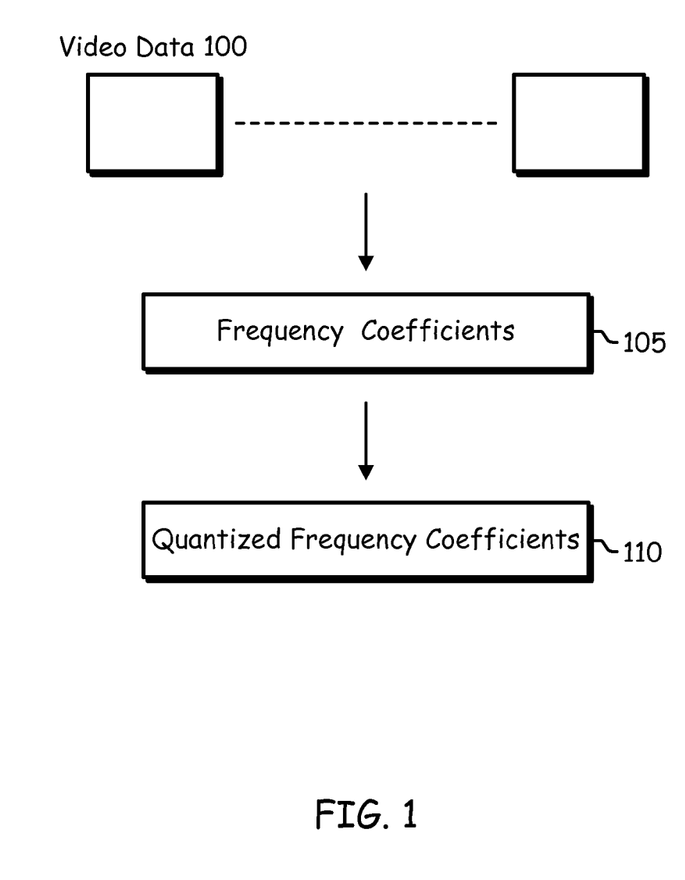
FIG. 1 is a block diagram describing the of video data.

Referring now to FIG. 1, there is illustrated a block diagram describing the encoding of video data. Video data comprises a series of pictures 100. The video data is compressed using a variety of techniques that take advantage of both temporal and spatial redundancies. Pixel-to-frequency transformations are applied to take advantage of spatial redundancies. The transformation result in a set of frequency coefficients 105. The frequency coefficients 105 are then quantized 110. The quantization further compresses the video data by controlling the numbers of bits that are used to quantize the frequency coefficients. Additional compression techniques are then used to further compress the video data.

The quantization techniques used depend on the encoding standard. The encoding standards include standards promulgated by the Motion Picture Experts Group (MPEG) and that promulgated by the Society of Motion Pictures and Television Engineers (SMPTE) and Microsoft Corporation. The standards promulgated by MPEG include MPEG1, MPEG-2 and MPEG-4, Part 10 (also known as Advanced Video Coding and also known and now referred to as H.264). VC-1 is a standard promulgated by the SMPTE, and by Microsoft Corporation (as Windows Media 9 or WM9).

Figure 2:
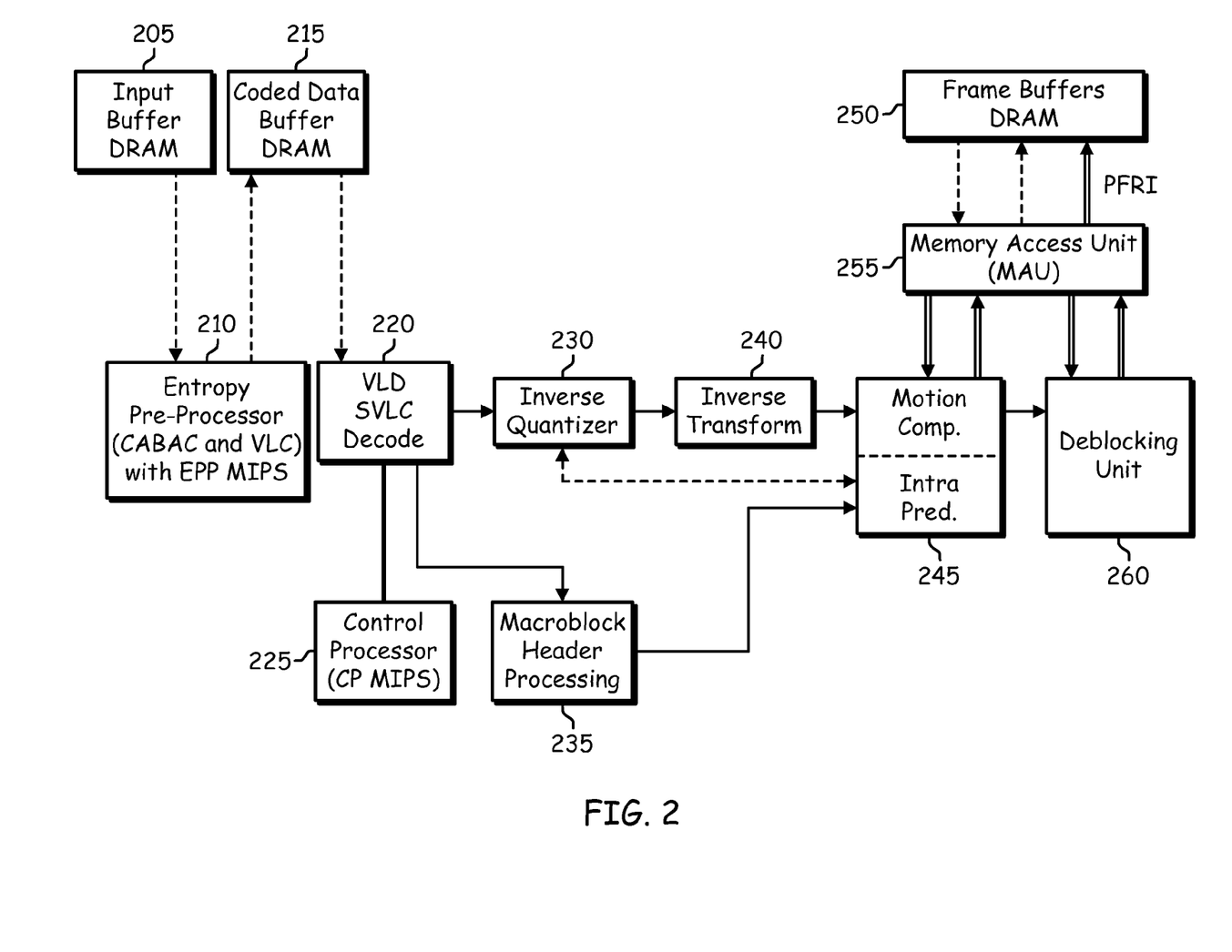
FIG. 2 is a block diagram describing a video decoder in accordance with an embodiment of the present invention.

Referring now to FIG. 2, there is illustrated a block diagram describing an exemplary video decoder 200 in accordance with an embodiment of the present invention. The video decoder 200 comprises an entropy pre-processor 205, a coded data buffer 210, a variable length decoder 215, a control processor 220, an inverse quantizer 225, a macroblock header processor 230, an inverse transformer 235, a motion compensator 240, a deblocker 245, a memory access unit 250, and frame buffers 255.

The entropy pre-processor 205 receives encoded video data. The encoded video data can comprise entropy coded symbols. The entropy pre-processor 205 decodes the entropy coded symbols. The entropy pre-processor 205 writes the symbols to the coded data buffer 210. The variable length decoder 215 decodes variable length codes in the encoded video data.

The foregoing results in quantized frequency coefficients 110 and macroblock headers. The inverse quantizer 225 inverse quantizes the quantized frequency coefficients 110, resulting in frequency coefficients 105. The inverse transformer 235 inverse transforms the frequency coefficients 105, resulting in pixel data. The motion compensator 240 motion compensates the pixel data, using previously decoded pictures 100 stored in the frame buffers 255.

The quantization techniques used depend on the encoding standard. As mentioned above, the encoding standards include standards promulgated by the Motion Picture Experts Group (MPEG) and that by the Society of Motion Pictures and Television Engineers (SMPTE) and Microsoft Corporation. Again, the standards promulgated by MPEG include MPEG1, MPEG-2 and MPEG-4, Part 10 (also known as Advanced Video Coding and also known and now referred to as H.264). VC-1 is a standard promulgated by the SMPTE, and by Microsoft Corporation (as Windows Media 9 or WM9. Accordingly, the inverse quantizer 225 is capable of inverse quantizing video data encoded in accordance with a plurality of standards. In certain embodiments of the present invention, the inverse quantizer 225 can inverse quantize video data encoded in accordance with the MPEG-2, H.264, and VC-1 standards.

Figure 3:
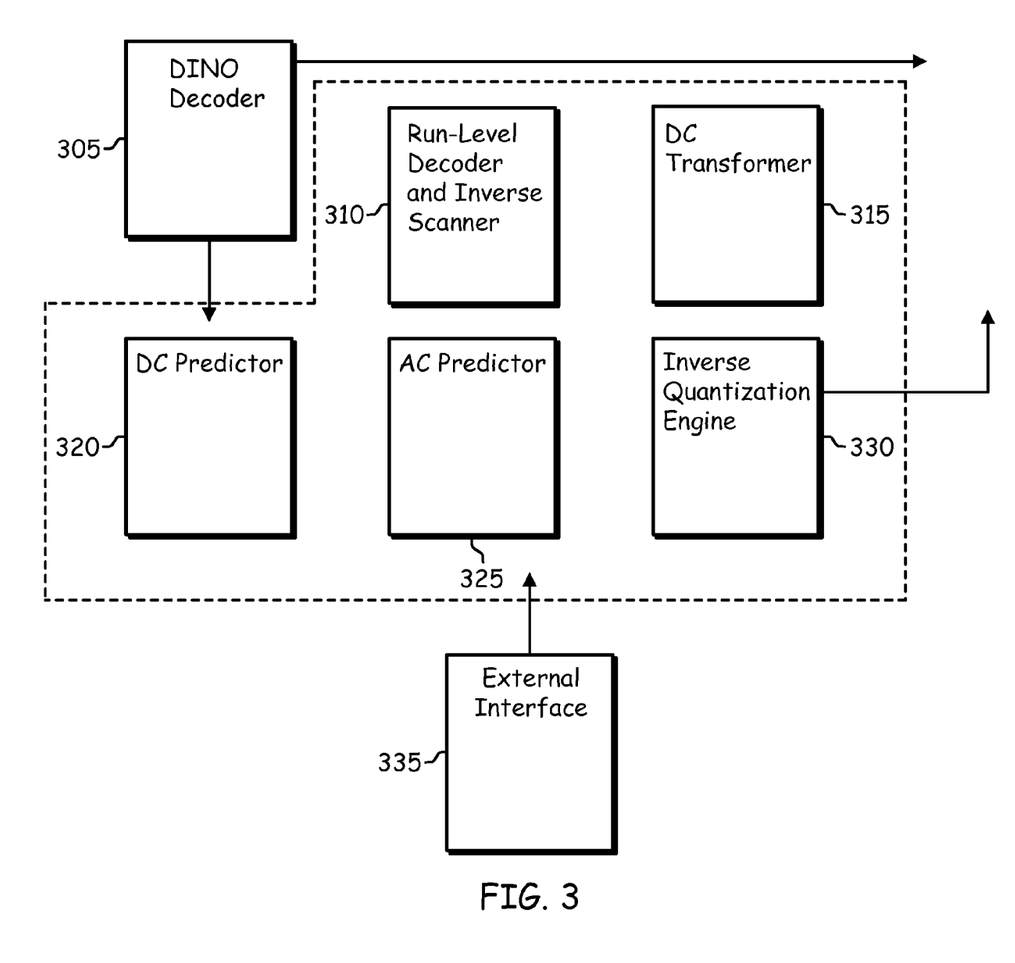
FIG. 3 is a block diagram describing an exemplary inverse quantizer in accordance with an embodiment of the present invention.

Referring now to FIG. 3, there is illustrated a block diagram describing an exemplary inverse quantizer 225 in accordance with an embodiment of the present invention. The inverse quantizer 225 comprises a run level decoder and inverse scanner 310, a DC transformer 315, a DC predictor 320, an AC predictor 325, an inverse quantization engine 330, and external interfaces 335.

Run-Level Decoder/DC Prediction/Inverse Scan

The run level decoder/inverse scanner 320 and DC predictor 320 can be clubbed in a single data path if their operations are sequentially dependent. The run level decoder/inverse scanner 310 does the "zero" filling operation, decided by the run count of the current run-level pair. DC predictor 320 performs DC prediction if DC prediction is enabled for the current block. This is present in intra blocks of VC-1. This is done by choosing the prediction direction, which is based on the relative DC values of the neighboring left, top and diagonal blocks. The inverse scan operation is accomplished by providing a correct address of a buffer based on a lookup table value. These lookup table values are programmed during the picture level initialization.

AC Prediction

The AC predictor 325 performs AC prediction if AC prediction is enabled for the current block under decode. AC prediction is present in the VC-1 video standard. The DC-Predictor 320 supplies the prediction direction and the prediction data will be from either top row or the left column. The prediction coefficients are written to a DRAM.

DC Transform

The DC transformer 315 performs matrix multiplication of the DC-only luma and chroma sub-blocks of AVC with the constant matrix. The constant matrix has signed unit coefficients. Based on this fact, matrix multiplication is performed by add-accumulate operation. There are two passes in the DC transform for two sets of matrix multiplication.

Inverse Quantization

The inverse quantization engine 330 supports inverse quantization for a plurality of video encoding standards. In certain embodiments of the present invention, the inverse quantization engine 230 comprises an MPEG1/MPEG-2 inverse quantizer 335, an H.264 inverse quantizer 340, and a VC-1 inverse quantizer 345, and there are seven types of the inverse quantization present based on the block-type (video standard under decode), where MPEG2 has two types, AVC has three types and VC-1 has two types. The type of the Inverse quantization depends on the macro-block type and Luma-chroma blocks (sub-blocks).

MPEG-2 Inverse Quantization

In MPEG-2, the inverse quantization process can be numerically equivalent to the following pseudo-code. The dequantization operation is done on the output of the coefficients after inverse scan operation.

```
for (v=0; v<8;v++) {
    for (u=0; u<8;u++) {
        if (QF[v] [u] == 0)
            F" [v] [u] = 0;
        else if ( (u==0) && (v==0) && (macroblock_intra) ) {
            F" [v] [u] = intra_dc_mult * QF[v] [u];
        } else {
            if ( macroblock_intra ) {
                F" [v] [u] = (QF[v] [u] *W[0] [v] [u] *quantiser_
                    scale*2)/32;
            } else {
                F" [v] [u] = ( ( ( QF[v] [u] *2) +Sign(QF[v] [u] ) ) *
                    W[1] [v] [u] * quantiser_scale ) / 32;
            }
        }
    }
}
```

The result of dequantization is used for saturation and mismatch operation. A mathematical process equivalent to the following performs the mismatch/saturation operation.

MPEG-2 has two types of inverse quantization. The classification is based on the macro-block type, intra or non-intra macroblocks. In case of intra macroblocks, the sign function is included for inverse quantization operation and other wise not included.

Figure 4:
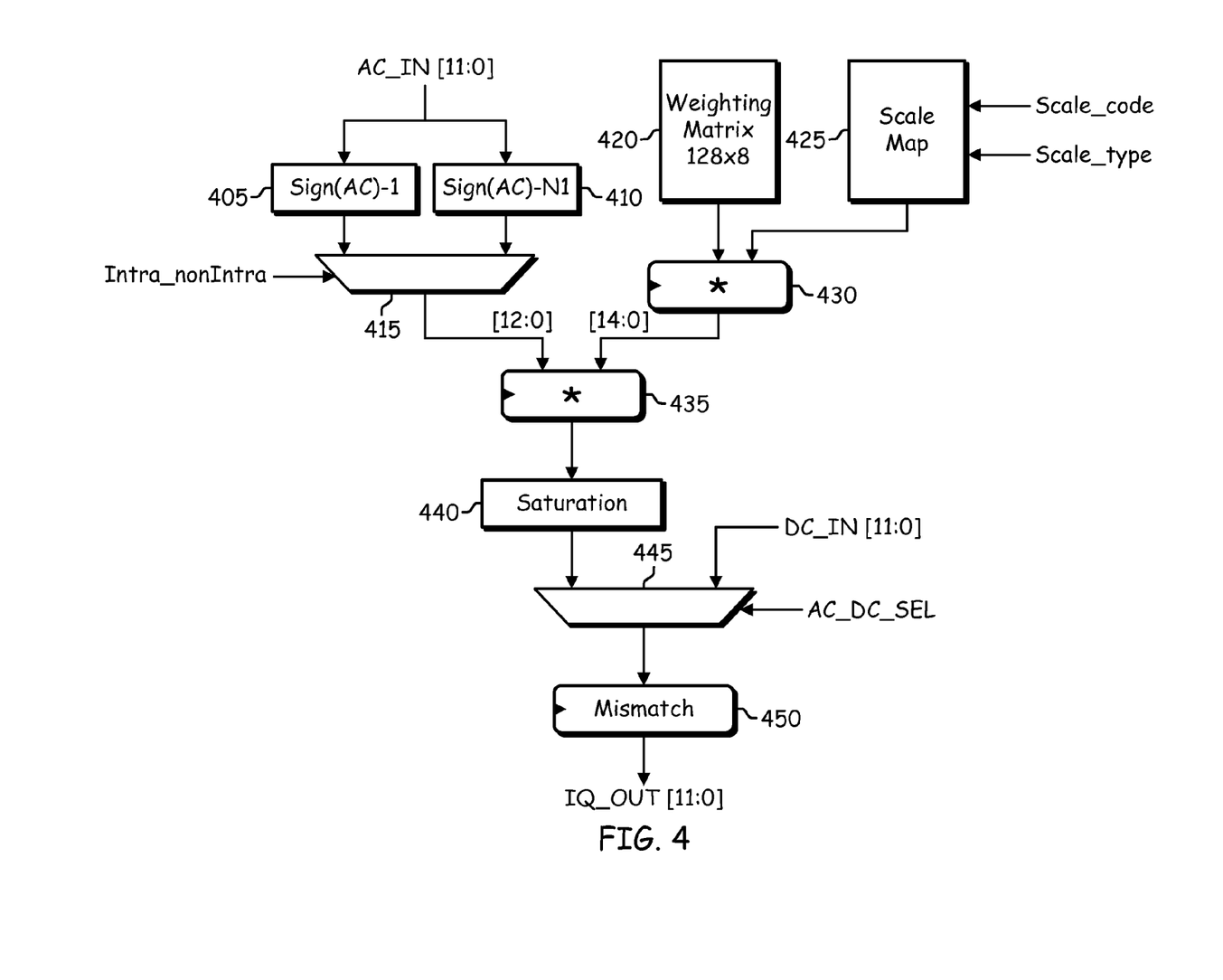
FIG. 4 is a block diagram describing a circuit for inverse quantizing video data encoded in accordance with the MPEG-2 encoding standard.

Referring now to FIG. 4, there is illustrated a block diagram of a circuit for inverse quantizing video data encoded in accordance with the MPEG-2 standard. The circuit uses two multipliers that operate independently. There are four register stages in the data path to reduce the critical timing issue.

Registers 405 and 410 receive AC_Coeff data from Run-level decoder. Multiplexer 415 selects between the contents of register 405 and register 410 based on a control signal indicating whether the macroblock is intracoded or non-intracoded. Multiplier 430 multiplies the output of weighting matrix 420 and scale map 425. Multiplier 435 multiplies the output of multiplexer 415 and multiplier 430 and provides the product to register 440. Multiplexer 445 selects between the contents of the register 440 and DC coefficients, DC_IN[11:0] based on signal, AC_DC_SEL, that indicates whether the coefficients is an AC coefficient or a DC coefficient. Register 450 receives the selection of multiplexer 445 and provides the inverse quantized output IQ_OUT[11:0].

H.264 Inverse Quantization

There are three types of Inverse scaling (or Dequantization) procedure that are used for different sub block types.
1. luma DC-only
2. chroma DC-only sub-blocks
3. all other chroma and luma AC-only and AC+DC sub blocks.

In all these equations, i and j form a two-dimensional frequency index for coefficients within each sub block.

Luma DC Sub Blocks

Inverse Scaling is performed according to the following:
If $QP_y$ is greater than or equal to 12, the scaled result shall be derived as $$dcY_{ij} = (f_{ij} * \text{LevelScale} (QP_Y \% 6, 0, 0)) << (QP_Y/6-2), i, j=0 \ldots 3 \quad \text{Eq. 1}$$

Otherwise ($QP_y$ is less than 12), the scaled results shall be derived as $$dcY_{ij} = (f_{ij} * \text{LevelScale} (QP_Y \% 6, 0, 0) + 2^{1-QP/6}) >> (2 - QP_Y/6), i, j=0 \ldots 3 \quad \text{Eq. 2}$$

The output of this operation is the matrix dcY.

Chroma DC Sub Blocks Inverse Scaling is performed according to the following.

If $QP_C$ is greater than or equal to 6, the scaling result shall be derived as $$dcC_{ij}=(f_{ij}*\text{LevelScale}(QP_C\%6,0,0))<<(QP_C/6-1), i, j=0, 1 \quad \text{Eq. 3}$$

Otherwise ($QP_C$ is less than 6), the scaling results shall be derived by $$dcC_{ij}=(f_{ij}*\text{LevelScale}(QP_C\%6,0,0))>>1, \text{ with } i, j=0, 1 \quad \text{Eq. 4}$$

The output of this operation is the matrix dcC.

For all other Sub Blocks:

Scaling is performed according to the following equation. If it is a chroma block, $QP=QP_C$ in the following equation. If it is a luma block, $QP=QP_Y$ in the following equation.

$$w_{ij}=(c_{ij}*\text{LevelScale}(QP\%6, i, j))<<(QP/6), \text{ with } i, j=0\ldots3 \quad \text{Eq. 5}$$

The function LevelScale (m, i, j) is a mathematical function that is used in the inverse scaling process (or Dequantization process) and is defined as follows:

$$\text{LevelScale}(m, i, j) = \begin{cases} v_{m0} & \text{for } (i, j) \in \{(0, 0), (0, 2), (2, 0), (2, 2)\}, \\ v_{m1} & \text{for } (i, j) \in \{(1, 1), (1, 3), (3, 1), (3, 3)\}, \\ v_{m2} & \text{otherwise;} \end{cases}$$

where the first and second subscripts of v are row and column indices, respectively, of the matrix specified as:

$$v = \begin{bmatrix} 10 & 16 & 13 \\ 11 & 18 & 14 \\ 13 & 20 & 16 \\ 14 & 23 & 18 \\ 16 & 25 & 20 \\ 18 & 29 & 23 \end{bmatrix}.$$

Figure 5:
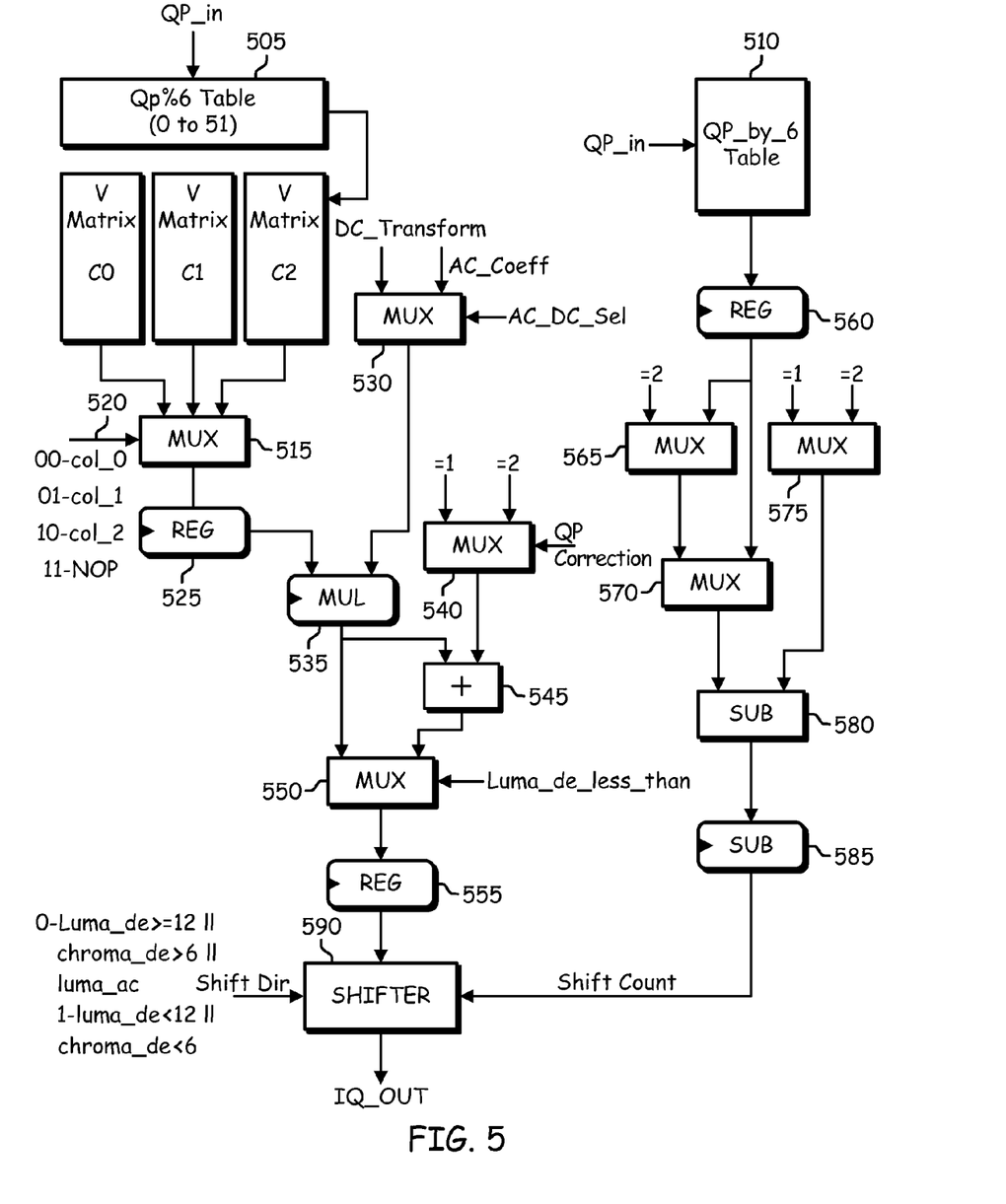
FIG. 5 is a block diagram describing a circuit for inverse quantizing video data encoded in accordance with the H.264 encoding standard.

Referring now to FIG. 5, there is illustrated a block diagram describing an exemplary circuit for inverse block H.264 encoded video data. Inverse Quantization of AVC is given by Equations 1-5. There are five types of Inverse quantization to be done on the AC data stream. AVC can have separate DC-only blocks for Luma and Chroma, the inverse quantization is different for these sub-blocks. The common feature seen in this operation is that there is a multiplication and right shift by a fixed number. The modules and the divisions are implemented by use of look-up table, because the inputs to this look-up table have a fixed number of values.

QP_in is used to address the two tables of QP %6 505 and QP/6 tables 510. There are 51 and 31 entries in these tables, respectively, which are calculated as per the equation 1-5. Based on the type of sub-block to be decoded, the mux select signals, AC_DC_Sel, QP Correction, Luma_dc_less_than_12 are generated to pass the appropriate table or the processed table values to the multipliers. A shift count logic generates the shift count, Shift_Dir based on the block to be decoded. The direction of the shifter is based on the Luma-chroma block under decode as shown in FIG. 5.

The Qp %6 Table 505 receives input QP_in and provides an output to V Matrix C0, V Matrix C1, and V Matrix C2.

Multiplexer 515 receives outputs from the V Matrix C0, V Matrix C1, and V Matrix C2 and selects one of the three based on control signal 520. Register 525 receives the output of multiplexer 515. Multiplexer 530 receives a DC Transform input, DC Transform, and AC Coefficient, AC Coeff, and selects one of the two based on control signal, AC_DC_Sel.

Multiplier 535 receives and multiplies the outputs of register 525 and multiplexer 530. Multiplexer 540 outputs either a one or a two based on a control signal, QP Correction. Adder 545 adds the outputs of multiplier 535 and multiplexer 540. Multiplexer 550 selects one of the outputs of multiplexer 535 and adder 545, and provides the selection to register 555.

Register 560 receives the output of QP_by_6 table 510 and provides the output to multiplexers 565 and 570. Multiplexer 570 selects between the outputs of multiplexers 565 and register 560. Multiplexer 575 selects between a one and a two. Subtractor 580 takes the difference between multiplexers 570 and 575 and provides the result to register 585. Shifter 590 receives the contents of registers 555 and subtractor 585 and provides an inverse quantized output, IQ_OUT.

VC-1 Inverse Quantization

DC Coefficient quantization in Intra blocks: The DC coefficient is reconstructed by performing the following de-quantization operation:

$$DC\text{Coefficient}=DC\text{ Coeff }Q*DC\text{StepSize} \quad \text{Equation 6}$$

The value of DCStepSize is based on the value of PQUANT (or MQUANT in P, B pictures) and is provided via DINO. CP-MIPS FW calculates this parameter.

AC Coefficients in Intra blocks and Coefficients in Inter Blocks:

The AC coefficients in Intra blocks and all coefficients in Inter blocks are dequantized using the following procedure. A picture layer parameter, PQUANT is used to determine whether the 3-QP or 5-QP deadzone quantizer is used.

dequant_coeff=quant_coeff*double_quant (if 3-$QP$ deadzone quantizer), or dequant_coeff=quant_coeff*double_quant+sign (quant_coeff)*quant_scale (if 5-$QP$ deadzone quantizer)     Equation 7 where:

quant_coeff is the quantized coefficient dequant_coeff is the inverse quantized coefficient double_quant=2*quant_scale (PQUANT or MQUANT)+HalfStep quant_scale=(PQUANT or MQUANT)

half_step=syntax element encoded at the picture layer.

Figure 6:
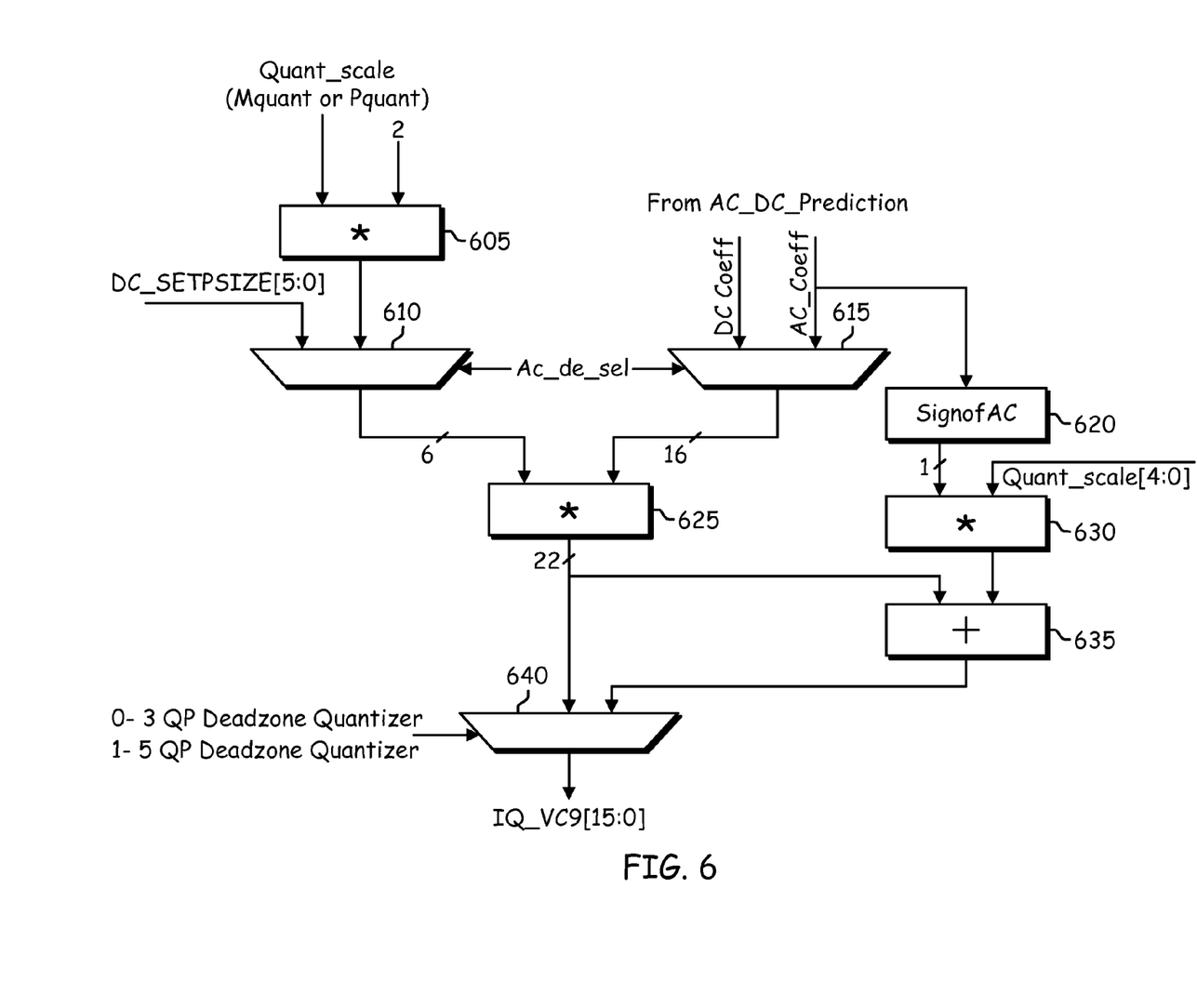
FIG. 6 is a block diagram describing a circuit for inverse quantizing video data encoded in accordance with the VC-1 encoding standard.

Referring now to FIG. 6, there is illustrated a block diagram describing an exemplary circuit for inverse quantizing video data encoded in accordance with the VC-1 standard. There are two types of inverse quantization operations present in VC-1 as shown in equations 6 and 7 for DC values of intra blocks and AC values of intra and all inter blocks.

A common data path diagram is used to perform both the inverse quantization operations. Selecting the AC and DC value controls these operations. The control unit generates the AC DC select signal based on the transform coefficient under decode. Based on the Quantizer dead-zone values a correction applied to the AC values. If the Quantizer dead-zone is 5QP, a Quantizer scale code is considered and added to the inverse Quantized values.

The circuit comprises a first multiplier 605 that multiplies the quantizer scale, Quant_scale (Mquant or Pquant), by 2. Multiplexer 610 receives the output of the multiplier 605 and the DC stepsize, DC_STEPSIZE, and selects one of the two based on a signal, Ac_dc_sel that indicates whether the coefficients received are AC coefficients or DC coefficients. Multiplexer 615 receives both AC coefficients and DC coefficients and selects one of the two based on the signal, Ac_dc_sel. Register 620 receives the sign of the AC coefficient, SignofAC and provides the sign to multiplier 630. Multiplier 630 multiplies the sign of the AC coefficient, SignofAC by the quantizer scale, Quant_scale [4:0].

Multiplier 625 receives and multiplies the outputs of multiplixer 610 and multiplexer 615. Adder 635 receives and adds the outputs of multiplier 625 and multiplier 630. Multiplexer 640 receives the outputs of multiplier 625 and adder 635, and selects one of the two based on a signal indicating either 3QP Deadzone Quantizer or 5 QP Deadzone Quantizer.

Figure 7:
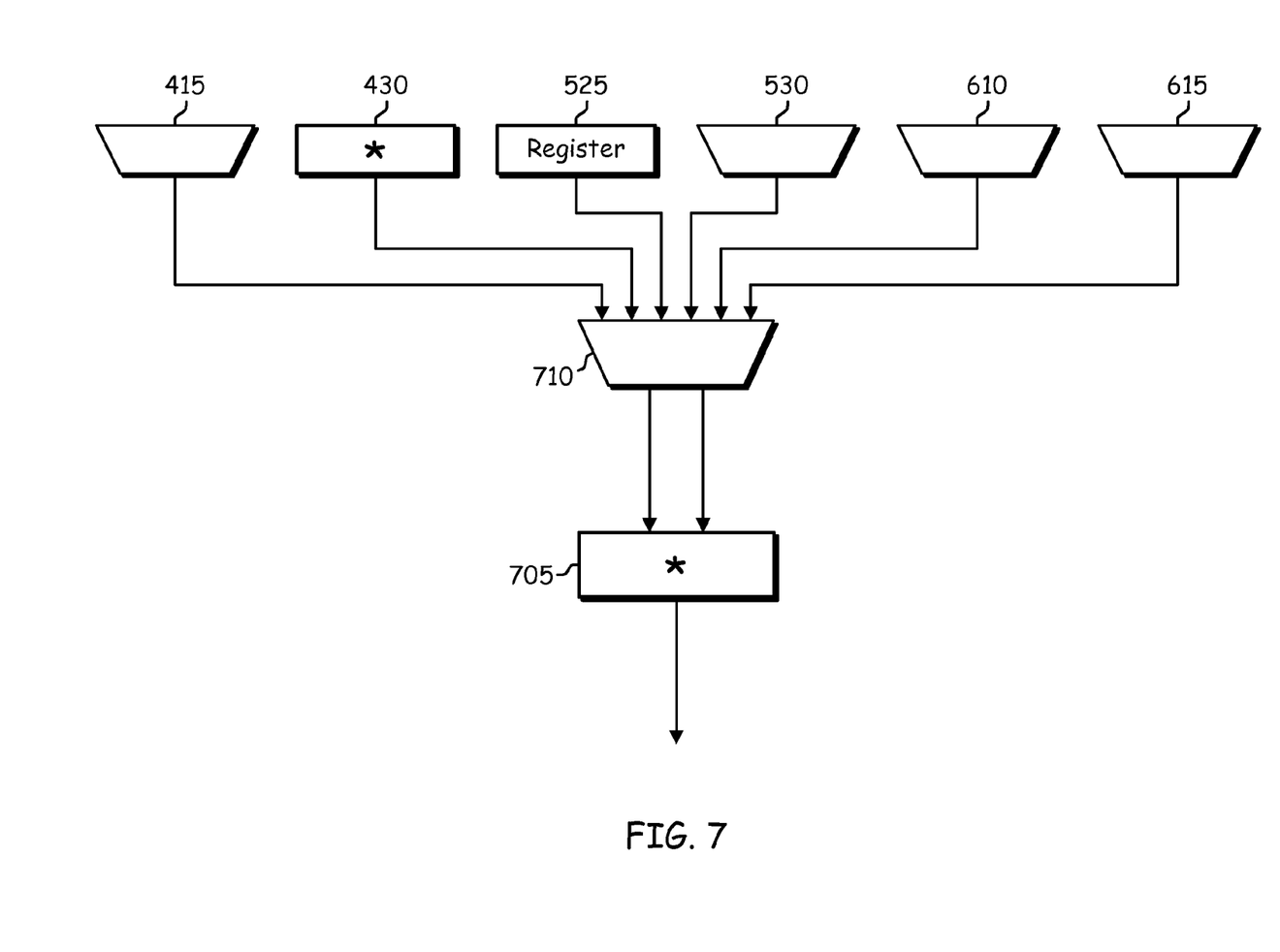
FIG. 7 is a block diagram of a multiplexer forming a portion of circuits for inverse quantizing video data in accordance with the MPEG1 and MPEG-2 encoding standard, H.264 encoding standard, and the VC-1 encoding standard.

In certain embodiments of the present invention, MPEG-2 inverse quantizer 335, H.264 inverse quantizer 340, and VC-1 inverse quantizer 345 can use common logic. Referring now to FIG. 7, there is illustrated a block diagram describing of a multiplier 705 forming a portion of MPEG-2 inverse quantizer 335, H.264 inverse quantizer 340, and VC-1 inverse quantizer 345. The multiplier 705 performs the function of multiplier 435 in the MPEG-2 inverse quantizer 335, multiplier 535 in the H.264 inverse quantizer 340, and multiplier 625 in the VC-1 inverse quantizer 345.

A 6:2 multiplexer 710 receives outputs of multiplexer 415, multiplier 430, register 525, multiplexer 530, multiplexer 610, and multiplexer 615, based on whether the video data is MPEG-2, H.264, or VC-1 encoded.

Figure 8:
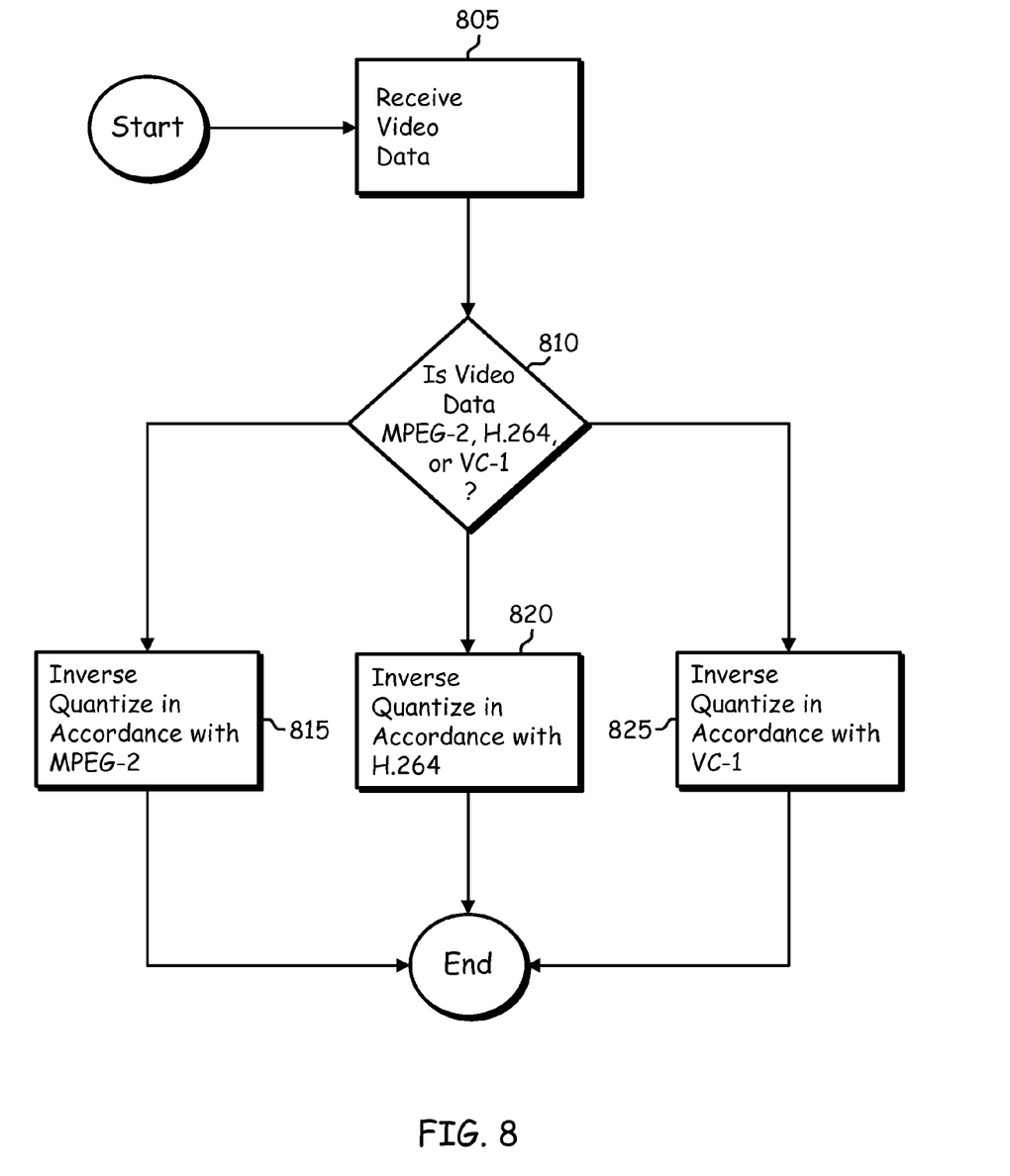
FIG. 8 is a flow diagram describing the inverse quantization of video data from a plurality of standards in accordance with an embodiment of the present invention.

Referring now to FIG. 8, there is illustrated a flow diagram describing the inverse quantization of video data from a plurality of standards in accordance with an embodiment of the present invention. At 805, the video data is received. At 810, the encoding standard for the video data is determined. If at 810, the video data is MPEG-2, at 815, the video data is inverse quantized in accordance with the inverse quantization for the MPEG-2 standard. If at 810, the video data is H.264, at 820, the video data is inverse quantized in accordance with the inverse quantization for the H.264 standard. If at 825, the video data is VC-1, at 825, the video data is inverse quantized in accordance with the inverse quantization for the VC-1 standard.

The embodiments described herein may be implemented as a board level product, as a single chip, application specific integrated circuit (ASIC), as part of an ASIC containing other functions, or with varying levels of the decoder system integrated with other portions of the system as separate components.

The degree of integration of the decoder system will primarily be determined by the speed and cost considerations. Because of the sophisticated nature of modern processor, it is possible to utilize a commercially available processor, which may be implemented external to an ASIC implementation. If the processor is available as an ASIC core or logic block, then the commercially available processor can be implemented as part of an ASIC device wherein certain functions can be implemented in firmware. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope.

Therefore, it is intended that the present invention not be limited to the particular embodiment disclosed, but that the present invention will include all embodiments falling within the scope of the appended claims.

What is claimed is:

1. A system for decoding video data, said system comprising:
an inverse quantizer for inverse quantizing video data encoded in accordance with a first encoding standard and for inverse quantizing video data encoded in accordance with a second encoding standard, wherein the inverse quantizer comprises:
a memory for storing a DC coefficient for a left neighboring block, a top neighboring block, and a top left neighboring block for predicting a DC coefficient for inverse quantizing a subsequent block.

2. The system of claim 1, wherein the first encoding standard is MPEG-2 and the second encoding standard is H.264.

3. The system of claim 2, wherein the inverse quantizer inverse quantizes at least some blocks that are 4×4 and 8×8.

4. The system of claim 2, wherein the inverse quantizer inverse quantizes at least some blocks that have only DC coefficients.

5. The system of claim 2, wherein the inverse quantizer inverse quantizes at least some blocks that have only AC coefficients.

6. The system of claim 1, wherein the inverse quantizer inverse quantizes video data encoded in accordance with a third encoding standard.

7. The system of claim 6, wherein the first encoding standard is MPEG-2, the second encoding standard is H.264, and the third encoding standard is VC-1.

8. The system of claim 7, wherein the inverse quantizer inverse quantizes at least some DC coefficients based at least in part on whether or not blocks containing the DC coefficients are I-blocks.

9. The system of claim 6, further comprising:
a first circuit for inverse quantizing the video data encoded in accordance with the first encoding standard;
a second circuit for inverse quantizing the video data encoded in accordance with the second encoding standard; and
a third circuit for inverse quantizing the video data encoded in accordance with the third encoding standard.

10. The system of claim 9, further comprising:
a multiplier forming a portion of the first circuit, the second circuit, and the third circuit.

11. The system of claim 1, wherein the memory stores AC coefficients for the left neighboring block and top neighboring block, and wherein the inverse quantizer predicts the AC coefficients on either the AC coefficients stored for the left neighboring block or top neighboring block based at least in part on the DC coefficients saved for the left neighboring block, top neighboring block, and top left neighboring block.

12. A decoder for decoding video data, said decoder comprising:
an inverse quantizer operable to inverse quantize video data encoded in accordance with a first encoding standard and for inverse quantizing video data encoded in accordance with a second encoding standard, wherein the inverse quantizer comprises:

a memory for storing a DC coefficient for a left neighboring block, a top neighboring block, and a top left neighboring block for predicting a DC coefficient for inverse quantizing a subsequent block.

13. The decoder of claim 12, wherein the first encoding standard is MPEG-2 and the second encoding standard is H.264.

14. The decoder of claim 12, wherein the inverse quantizer is operable to inverse quantize video data encoded in accordance with a third encoding standard.

15. The decoder of claim 14, wherein the first encoding standard is MPEG-2, the second encoding standard is H.264, and the third encoding standard is VC-1.

16. The decoder of claim 14, further comprising:
a first circuit operable to inverse quantize the video data encoded in accordance with the first encoding standard;
a second circuit operable to inverse quantize the video data encoded in accordance with the second encoding standard; and
a third circuit for operable to inverse quantize the video data encoded in accordance with the third encoding standard.

17. The system of claim 16, further comprising:
a multiplier forming a portion of the first circuit, the second circuit, and the third circuit.

* * * * *